P. M. WELSH.
GLASS HOLDER.
APPLICATION FILED DEC. 2, 1910.

985,085.

Patented Feb. 21, 1911.

Witnesses
Elwood H. Barkelew
Daniel S. Halladay

Inventor
Prudence M. Welsh
by James T. Barkelew
her Attorney.

UNITED STATES PATENT OFFICE.

PRUDENCE M. WELSH, OF LONGBEACH, CALIFORNIA.

GLASS-HOLDER.

985,085.

Specification of Letters Patent. Patented Feb. 21, 1911.

Application filed December 2, 1910. Serial No. 595,174.

*To all whom it may concern:*

Be it known that I, PRUDENCE M. WELSH, a citizen of the United States, residing at Longbeach, in the county of Los Angeles and State of California, have invented new and useful Improvements in Glass-Holders, of which the following is a specification.

This invention relates to glass holders for such glasses as are usually employed for effervescing liquids, and especially for such drinks as are generally known under the term "sodas;" and the prime object of the invention is to provide a device which will catch the overflow or drippings which run down the outside of such a glass and thus to prevent these drippings from coming in contact with the drinker's person or clothing, and further to prevent the drippings from flowing onto the table or counter, and to provide a device for this purpose which is simple in construction and which may be readily applied to the glass holders now in general and extensive use. Heretofore, such devices of which I am aware have necessitated a special and more or less expensive construction; but my device requires the minimum change of construction.

The invention consists of a trough and drip catching lip taking the place of the usual upper ring or rim of the glass holder. Otherwise, the construction of the holder is precisely the same as now generally in use. The trough is so arranged with an overhanging wall that the drippings cannot run from the same when the glass is upturned for drinking. I have shown a form in which the trough is of the same size completely around the glass and also a form in which there is an enlargement at the point where the handle is attached, this enlargement serving to hold an increased quantity of the drippings.

Figure 1:
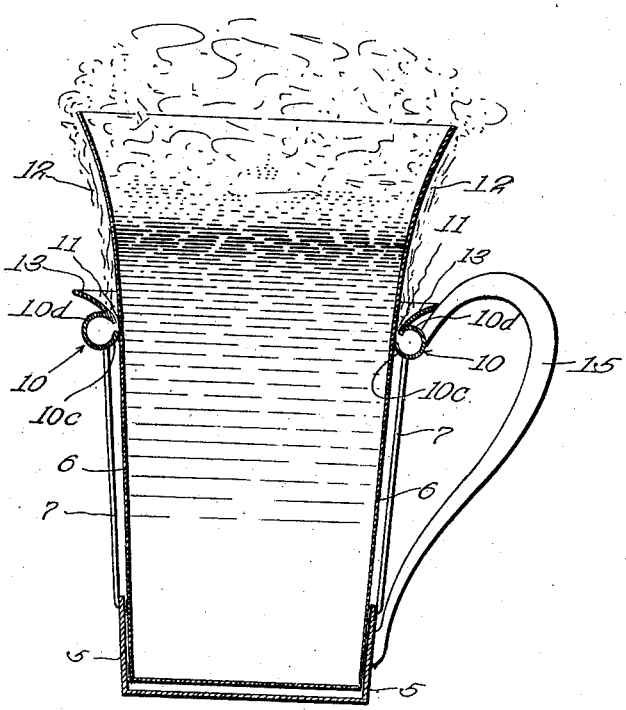
Figure 2:
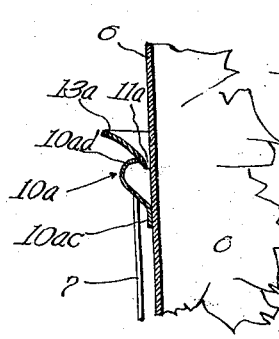
Figure 3:
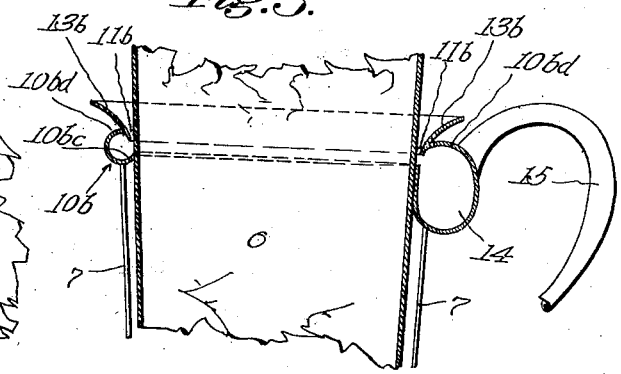

In the accompanying drawings Figure 1 is a sectional view illustrating my improved glass holder with a glass therein. Fig. 2 is a detail section showing the structure of a modified form of trough. Fig. 3 is a section showing the form of trough illustrated in Fig. 1 provided with an enlargement under the handle.

Referring to the drawings, 5 designates a base of any configuration for surrounding the bottom of a glass 6. This base and side supports 7 are of any ordinary construction. Supports 7 being commonly made of ornamental wire or of flat bars, the holders are of open construction rather than being in the form of a solid cup. In place of the usual upper ring or rim of such a holder I have substituted a circular trough 10 which extends around the glass and has a portion 10$^c$ adapted to fit snugly against the glass. The trough is more or less circular in cross section and has an overhanging wall 10$^d$ which leaves only a small space 11 between its edge and the glass. The drippings 12 are caught by an outwardly and upwardly projecting lip 13 and pass through space 11 into trough 10. The drippings being usually of a foamy nature, an upturning of the glass will not cause them to run out of the trough, overhanging wall 10$^d$ preventing them from overflowing the trough in that position, and their naturally slow flow preventing them from all accumulating on the bottom side of the trough when the glass is upturned.

In Fig. 2 I have shown a modified form of trough with a flared opening and a downwardly extending flange 10$^{ac}$ which engages with the glass along a broader surface than in the form of Fig. 1. Otherwise the construction is the same.

In Fig. 3 I have shown a second modified form in which the trough 10$^b$ is provided with an enlargement 14 directly under handle 15. This enlargement is thus placed in a position where it is partially covered by the handle and is therefore not unsightly, and forms a reservoir for a large amount of drippings.

It will be seen that I have provided a simple, inexpensive and efficient device. When the glass is removed it is very easily cleaned as all parts of the trough are directly exposed. This is particularly true of the form shown in Fig. 2.

Having described my invention, I claim:

1. A glass holder, comprising a body portion, and a rim surmounting the body portion, the rim comprising a trough having one wall adapted for engagement with a glass and having the other wall overhanging to a point adjacent the glass, and an outwardly and upwardly extending lip attached to the edge of the overhanging trough wall.

2. A glass holder, comprising a body portion, and a rim surmounting the body portion, the rim comprising a trough having one wall adapted to engage a glass with its edge and having the other wall overhanging the trough and extending to a point adjacent the glass, a handle attached to the rim and the body portion, and an enlargement in the trough at a point adjacent the handle attachment.

3. A glass holder, comprising a body portion, and a rim surmounting the body portion, the rim comprising a trough adapted to engage a glass with the edge of one of its walls and having its other wall overhanging the trough to a point adjacent the glass, an upwardly and outwardly extending lip attached to the edge of the overhanging trough wall, a handle mounted on the rim and the body portion, and an enlargement of the trough adjacent the handle attachment thereto.

In witness that I claim the foregoing I have hereunto subscribed my name this 23d day of November, 1910.

PRUDENCE M. WELSH.

Witnesses:
JAMES T. BARKELEW,
ELWOOD H. BARKELEW.